March 14, 1961 L. LE BLAN 2,975,234

MULTIPLEX TRANSMISSION SYSTEM FOR TELEVISION SIGNALS

Filed May 9, 1955

INVENTOR
LOUIS LE BLAN
BY [signature]
AGENT

United States Patent Office 2,975,234

Patented Mar. 14, 1961

2,975,234

MULTIPLEX TRANSMISSION SYSTEM FOR TELEVISION SIGNALS

Louis Le Blan, Paris, France, assignor, by mesne assignments, to North American Philips Company, Inc., New York, N.Y., a corporation of Delaware Filed May 9, 1955, Ser. No. 507,053

Claims priority, application France May 10, 1954

10 Claims. (Cl. 178—6)

Figure 1:
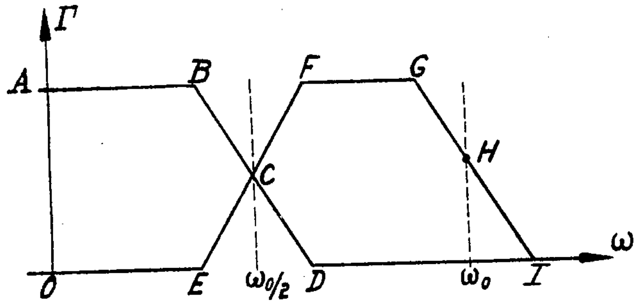

This invention relates to multiplex transmission systems for signals relating to television pictures or similar pictures scanned in lines in which at the transmitting end each of two signals is dotted with the aid of an associated dotting signal, whereafter the signals thus dotted are combined and the combined signal is supplied to a common transmission path, and in which at the receiving end the transmitted signal is dotted with the aid of each of two dotting signals, which as far as possible are in the same phase relationship with respect to the transmitted signal as are the dotting signals at the transmitting end.

It is to be noted that the term "dotting" is to be understood to mean modulating a signal on a series of pulses having the particularity that the phase thereof during one frame-changing period is shifted by $\pi$-radians with respect to the phase of the same series of pulses during a subsequent frame-changing period. As is well-known, this may be achieved inter alia by choosing the pulse repetition frequency to be equal to an odd multiple of half the line frequency used in the system.

It is also to be noted that a reference signal must be present in the transmitted signal to ensure that the dotting signals at the receiving end are in the same phase relationship with the transmitted signal as are the dotting signals at the transmitting end. Said reference signal may be provided, for example, in the form of a sinusoidal oscillation having a frequency equal to the pulse repetition frequency of the dotting signals and occurring during the back porches of the line synchronizing pulses.

In known systems the two dotting signals are also relatively shifted by $\pi$-radians both at the transmitting and the receiving ends.

Such systems afford the advantage that two signals, for example relating to television pictures, are transmitted in a frequency band having a width not larger than that of the frequency band necessary for the ordinary transmission of one of said signals.

This is offset by the fact that interference in the reproduced pictures occurs during the reproduction of the signals thus transmitted. However, due to the said phase relation during subsequent frame-changing periods, said interference is such that an interference which occurs during one frame-changing period is compensated at least visually by an analogous interference which occurs during the subsequent frame-changing period. Strictly speaking, this is true only if the signal leading to the interference does not vary from picture to picture. It is known that, if the variations are not excessive, this also approximately holds good for signals having different forms during subsequent frame-changing periods.

However, if a small deviation occurs in the phase relationship (hence in the synchronisation) between the series of pulses at the transmitting end and the series of pulses at the receiving end, crosstalk of one signal in the other is involved, so that during reproduction the image of one signal also shows an image of the other signal.

The object of the invention is to suppress considerably the troublesome influence of deviations in the said synchronisation. For this purpose the system according to the invention is characterized in that, at the transmitting end, the bandwidth of one dotted signal is limited to a frequency range comprised between 0 and a frequency equal to half the pulse repetition frequency of the dotting signals and that the other dotted signal is limited to a frequency range comprised between a frequency equal to half the pulse repetition frequency of the dotting signals and a frequency equal to the said pulse repetition frequency, the two signals thus limited in bandwidth being combined, and that at the receiving end the combined signal transmitted is divided into two parts, of which one has a bandwidth comprised between 0 and a frequency equal to half the pulse repetition frequency of the dotting signals and the other has a bandwidth comprised between a frequency equal to half the pulse repetition frequency of the dotting signals and a frequency equal to the said pulse repetition frequency, each part being dotted with the aid of a dotting signal having a phase relationship with the associated part equal to that of the dotting signal used at the transmitting end for obtaining the corresponding part.

In order that the invention may be readily carried into effect, it will now be described, by way of example, with reference to the accompanying drawing, in which Fig. 1 shows a transmission characteristic that may be used with the invention.

Figure 2:
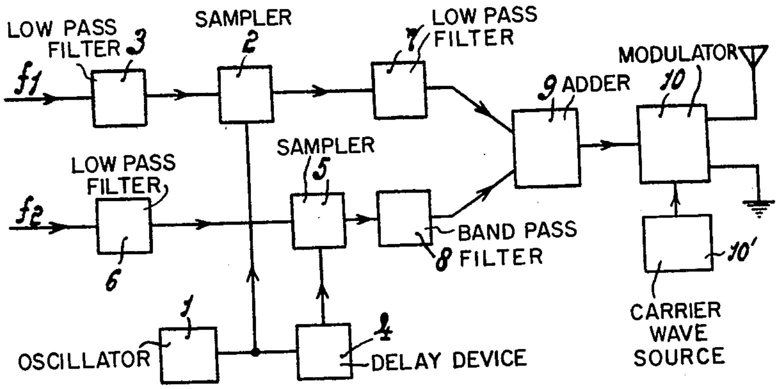
Figure 3:
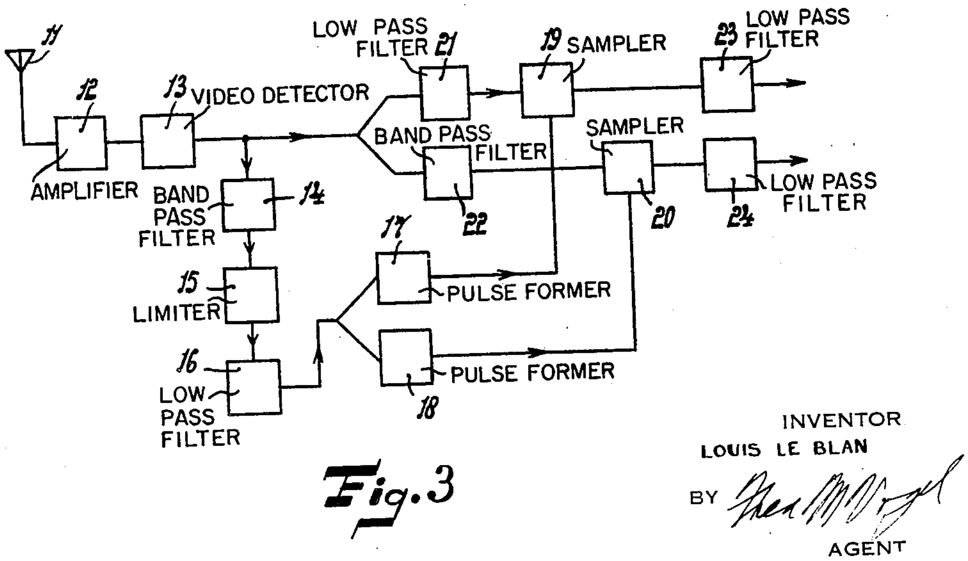

Fig. 2 shows diagrammatically an embodiment of a transmitter according to the invention and Fig. 3 shows diagrammatically an embodiment of a receiver according to the invention.

The signals to be transmitted, relating to television pictures of similar pictures scanned in lines, are indicated hereinafter by $f_1$ and $f_2$. The bandwidth of these signals is assumed to be comprised between the frequencies 0 and $N_0$.

According to the known method, the signals $f_1$ and $f_2$ may be transmitted in a frequency range which is not larger than that required for the ordinary transmission of one of said signals.

For this purpose the signal $f_1$, for example, is dotted with the aid of a signal $g_1'$:

$$g_1' = A\left\{1+\sum_{n=1}^{\infty} 2 \cos n\omega_0 t\right\}$$

wherein A indicates a constant and $\omega_0 = 2\pi N_0$. As is well known, it suffices to utilise a signal $g_1$:

$$g_1 = A\{1 \pm 2 \cos \omega_0 t\}$$

in view of the fact that the higher harmonics of $g_1'$, on account of the limited bandwidth of the transmission path, are immaterial in the transmission. It will also be seen that in $g_1$, instead of $+2 \cos \omega_0 t$, there is written: $\pm 2 \cos \omega_0 t$. This indicates that during one frame-changing period $g_1$ has the form $A\{1+2 \cos \omega_0 t\}$ and during the subsequent period $g_1$ has the form $A\{1-2 \cos \omega_0 t\}$, so that each time $t=0$ at the beginning of a new frame-changing period, thus expressing the phase difference of $\pi$-radians prevailing between the series of pulses during one frame-changing period and the series of pulses during a subsequent frame-changing period.

Assuming the signal $f_1$ to have the form:

$$f_1 = a \cos \omega_1 t + b \cos \omega_2 t$$

wherein $$\omega_1 < \omega_0 \text{ and } \omega_2 < \omega_0$$

dotting then provides a signal $f_1.g_1$ which is supplied to a low-pass filter having a cut-off frequency $N_0$. The output signal of this filter, indicated diagrammatically by $[f_1.g_1]0,\omega_0$, may be written as follows:

$$[f_1.g_1]0,\omega_0 = A[a \cos \omega_1 t + b \cos \omega_2 t \pm a \cos (\omega_0-\omega_1)t \pm b \cos (\omega_0-\omega_2)t]$$

The signal $f_2$ is dotted in an analogous manner with the aid of a signal $g_2$:

$$g_2=A\{1\mp 2\cos\omega_0 t\}$$

the signal $f_2 \cdot g_2$ thus dotted also being supplied to a low-pass filter having a cut-off frequency $N_0$. The output signal of this filter: $[f_2 \cdot g_2]0,\omega_0$, if $f_2$ has the form:

$$f_2=c\cos\omega_3 t+d\cos\omega_4 t$$

wherein $$\omega_3<\omega_0 \text{ and } \omega_4<\omega_0$$

is $$[f_2 \cdot g_2]0,\omega_0=A[c\cos\omega_3 t+d\cos\omega_4 t\mp c\cos(\omega_0-\omega_3)t\mp d\cos(\omega_0-\omega_4)t]$$

$[f_1 \cdot g_1]0,\omega_0$ and $[f_2 \cdot g_2]0,\omega_0$ are now combined and the signal thus formed $[f_1 \cdot g_1]0,\omega_0+[f_2 \cdot g_2]0,\omega_0$ is supplied to the transmission path, which may be a cable, but naturally also the air. In the latter case, the combined signal is modulated on a high-frequency carrier wave, the modulated carrier wave being supplied to a transmitting aerial.

At the receiving end there is thus produced, if desired with the use of an intermediate-frequency stage and a video-detector, the signal $[f_1 \cdot g_1]0,\omega_0+[f_2 \cdot g_2]0,\omega_0$.

Said signal is dotted, on the one hand, by a signal $G_1$:

$$G_1=B[1\pm 2\cos\omega_0 t]$$

and, on the other, by a signal $G_2$:

$$G_2=B[1\mp 2\cos\omega_0 t]$$

It is to be noted that the signals $G_1$ and $G_2$ are substantially identical with the signals $g_1$ and $g_2$ that are used at the transmitting end. In order to ensure this equality, it is possible in known manner to add to the signal to be transmitted a reference signal with which, or from which, the signals $G_1$ and $G_2$ may be obtained.

However, interference in the transmission path, or in the receiver, may temporarily neutralize the equality, so that at the receiving end, instead of signals $G_1$ and $G_2$, the signals $G_1'$ and $G_2'$ are produced:

$$G_1'=D[1\pm 2\cos(\omega_0 t+\delta)]$$
$$G_2'=B[1\mp 2\cos(\omega_0 t+\delta)]$$

wherein $\delta$ indicates a phase deviation.

Dotting of the signal $[f_1 \cdot g_1]0,\omega_0+[f_2 \cdot g_2]0,\omega_0$ with the aid of $G_1'$ provides, after limitation of bandwidth to $N_0$, a signal $f_1''$:

$$\begin{aligned}f_1''=A.B.[&a\cos\omega_1 t+b\cos\omega_2 t\pm a\cos(\omega_0-\omega_1)t\\ &\pm b\cos(\omega_0-\omega_2)t+c\cos\omega_3 t+d\cos\omega_4 t\\ &\pm c\cos(\omega_0-\omega_3)t\mp d\cos(\omega_0-\omega_4)t\\ &\pm a\cos\{(\omega_0-\omega_1)t+\delta\}\pm b\cos\{(\omega_0-\omega_2)t+\delta\}\\ &+a\cos(\omega_1 t+\delta)+b\cos(\omega_2 t+\delta)\\ &\pm c\cos\{(\omega_0-\omega_3)t+\delta\}\pm d\cos\{(\omega_0-\omega_4)t+\delta\}\\ &-c\cos(\omega_3 t+\delta)-d\cos(\omega_4 t+\delta)]\end{aligned}$$

If, now, $\delta=0$, and hence $G_1'=G_1$, then $f_1''$ changes to $f_1'$:

$$f_1'=2\,A.B.[a\cos\omega_1 t+b\cos\omega_2 t\pm a\cos(\omega_0-\omega_1)t\pm b\cos(\omega_0-\omega_2)t]$$

Considering that each of the terms $\pm a\cos(\omega_0-\omega_1)t$ and $\pm b\cos(\omega_0-\omega_2)t$ is, on the average, equal to zero during two frame-changing periods and that these terms in themselves produce only a point structure in the image, it will be evident that the eye is substantially not affected as a result thereof.

However, if $\delta\neq 0$, it appears from the above-mentioned expression for $f_1''$ that it also contains, although to a small extent, the signal $f_2$, which naturally is troublesome.

According to the invention, however, at the transmitting end, the bandwidth of th signal $f_1 \cdot g_1$ is limited to a frequency range comprised between 0 and $\frac{1}{2}N_0$. Assuming that there also applies:

$$0<\omega_1<\tfrac{1}{2}\omega_0 \text{ and } \tfrac{1}{2}\omega_0<\omega_2<\omega_0$$

the output signal $[f_1 \cdot g_1]0,\frac{1}{2}\omega_0$ of the filter bringing about the limitation in bandwidth thus is:

$$[f_1 \cdot g_1]0,\tfrac{1}{2}\omega_0=A[a\cos\omega_1 t\pm b\cos(\omega_0-\omega_0)t]$$

According to the invention, the bandwidth of the signal $f_2 \cdot g_2$ is limited to a frequency range comprised between $\frac{1}{2}N_0$ and $N_0$.

Assuming that the following relationships apply:

$$0<\omega_3<\tfrac{1}{2}\omega_0 \text{ and } \tfrac{1}{2}\omega_0<\omega_4<\omega_0$$

then the out-signal $[f_2 \cdot g_2]\frac{1}{2}\omega_0,\omega_0$ of the filter bringing about the limitation in bandwidth is:

$$[f_2 \cdot f_2]\tfrac{1}{2}\omega_0,\omega_0=A[\mp c\cos(\omega_0-\omega_3)t+d\cos\omega_4 t]$$

The signals $[f_1 \cdot g_1]0,\frac{1}{2}\omega_0$ and $[f_2 \cdot g_2]\frac{1}{2}\omega_0,\omega_0$ are combined again, the resultant signal $$[f_1 \cdot g_1]0,\tfrac{1}{2}\omega_0+[f_2 \cdot g_2]\tfrac{1}{2}\omega_0,\omega_0$$

being supplied to the transmission path.

At the receiving end there is obtained again, if desired with the use of an intermediate-frequency stage and a video-detector, the signal $[f_1 g_1]0,\frac{1}{2}\omega_0+[f_2 g_2]\frac{1}{2}\omega_0,\omega_0$.

The signal is supplied, on the one hand, to a low-pass filter having a cut-off frequency $\frac{1}{2}N_0$, and, on the other, to a band-pass filter having a transmission range comprised between $\frac{1}{2}N_0$ and $N_0$. Consequently, signals $[f_1 g_1]0,\frac{1}{2}\omega_0$ and $[f_2 g_2]\frac{1}{2}\omega_0,\omega_0$ are set up at the output of the low-pass filter and at the output of the band-pass filter respectively.

The signal $[f_1 g_1]0,\frac{1}{2}\omega_0$ is dotted with the aid of a signal $G_1$:

$$G_1=B[1\pm 2\cos\omega_0 t]$$

and the signal $[f_2 g_2]\frac{1}{2}\omega_0,\omega_0$ is dotted with the aid of a signal $G_2$:

$$G_2=B[1\mp 2\cos\omega_0 t]$$

In this case also interference in the synchronisation between $g_1$, $G_1$ and $g_2$, $G_2$ may arise, so that at the receiving end signals $G_1'$ and $G_2'$ are produced:

$$G_1'=B[1\pm 2\cos(\omega_0 t+\delta)]$$
$$G_2'=B[1\mp 2\cos(\omega_0 t+\delta)]$$

wherein $\delta$, as before, indicates the undesired deviation.

Dotting of $[f_1 g_1]\ 0,\ \frac{1}{2}\omega_0$ by $G_1'$ provides a signal $F_1''$:

$$\begin{aligned}F_1''=AB[&a\cos\omega,\ t\pm\delta\cos(\omega_0-\omega_2)t\\ &\pm a\cos\{(\omega_0-\omega_1)t+\delta\}\pm a\cos\{(\omega_0-\omega_1)t+\delta\}\\ &+b\cos\{(2\omega_0-\omega_2)t+\delta\}+b\cos t(\omega_2+\delta)]\end{aligned}$$

Limitation of bandwidth to $N_0$ provides a signal $F_1'$:

$$F_1'=AB[a\cos\omega,\ t\pm b\cos(\omega_0-\omega_2)t\pm a\cos\{(\omega_0-\omega_2)t+\delta\}+b\cos(\omega_2 t+\delta)]$$

It is observed that limitation of bandwidth is not absolutely necessary, since the term $\pm a\cos\{(\omega_0+\omega_1)t+\delta]$ has a compensating effect for the eye in subsequent frame-changing periods and the term $b\cos\{(2\omega_0-\omega_2)t+\delta\}$ has a high frequency such as to provide only a fine point structure, at least if this high frequency is reproduced by the picture tube.

The terms $\pm b\cos(\omega_0-\omega_2)t$ and $$\pm a\cos\{(\omega_0-\omega_1)t+\delta\}$$

also visually have a compensating effect in subsequent frame-changing periods; the terms playing a part in the structure of the image thus are: $a\cos\omega_1 t+b\cos(\omega_2 t+\delta)$. If $\delta=0$, this signal thus is exactly identical, except for a proportionality constant, with the signal $f_1$, produced at the transmitting end. However, if $\delta\neq 0$, this signal is no longer exactly identical with $f_1$, but interference resulting from the signal $f_2$ is not present therein. It is observed that the wrong phase in $b\cos(\omega_2 t+\delta)$ leads for $\delta\neq 0$ to a certain lack of definition in the image reproduced. The experience with ordinary black-and-white television receivers having a phase characteristic which is usually not exactly linear, leading to analogous phase deviations, shows that such lack of definition is usually substantially imperceptible.

Dotting of the signal $[f_2g_2]\ \frac{1}{2}\omega_0,\ \omega_0$ with the aid of a dotting signal $G_2'$ provides, after limitation in bandwidth to $N_0$, a signal $F_2'$:

$$F_2'=AB[c\cos(\omega_3t+\delta)+d\cos\omega_4t\mp c\cos(\omega_0-\omega_3)t\mp d\cos\{(\omega_0-\omega_4)t+\delta\}]$$

The terms $\mp c\cos(\omega_0-\omega_3)t$ and $\mp d\cos\{(\omega_0-\omega_4)t+\delta\}$ as before, visually have a compensating effect in subsequent frame-changing periods and the terms playing a part in the structure of the image thus are $$c\cos(\omega_3t+\delta)+d\cos\omega_4t$$

For $\delta=0$ this signal is again exactly identical with the initial signal $f_2$; for $\delta\neq0$ there is again introduced a certain phase deviation leading to lack of deviation, but even for $\delta\neq0$ crosstalk of the signal $f_1$ in the signal $f_2$ does not occur.

It will be evident from the foregoing that a certain phase relation between the series of pulses $g_1$, $g_2$ and $g_1$, $G_2$ and $G_1'$, $G_2'$, as required in the known system (hence that, for example, the signals $g_1$ and $g_2$ are relatively shifted by $\pi$-radians), is not required at all in the system according to the invention. This implies that the same series of pulses may be used for $g_1$ and $g_2$ and hence also for $G_1$ and $G_2$.

Fig. 2 shows diagrammatically one embodiment of a transmitter according to the invention, in which reference numeral 3 indicates a lowpass filter having a cut-off frequency $N_0$. Said filter has supplied to it one of the signals to be transmitted (in the figure the signal $f_1$) relating to, for example, a television picture. 6 also indicates a lowpass filter having a cut-off frequency $N_0$ and which has the other signal $f_2$ supplied to it. The output signals of the lowpass filters 3 and 6 are supplied to samplers or gates 2 and 5. 1 indicates an oscillator producing a series of pulses have a pulse repetition frequency $N_0$. Said series of pulses may have the form $$A\left[1+\sum_{n=1}^{\infty}2\cos n\omega_0t\right]$$

but, as mentioned hereinbefore, it also suffices to utilize a signal $A[1\pm2\cos\omega_0t]$. The sign $\pm$ indicates that the phase of the signal produced by the oscillator 1 during one frame-changing period is shifted by $\pi$-radians, with respect to the signal during a subsequent period. The output signal of the oscillator 1, for example $g_1$, is supplied to the sampler 2, in which the signal $f_1g_1$ is thus produced. The output signal of the oscillator 1 is also supplied to a device 4, in which it is delayed by $\pi$-radians, the output signal of the device 4, hence $g_2$, being supplied to the sampler 5 in which the signal $f_2g_2$ is thus produced. The output signal of sampler 2 is supplied to a lowpass filter having a cut-off frequency $\frac{1}{2}N_0$ and the output signal of sampler 5 is supplied to a bandpass filter 8 having a transmission range between the frequencies $\frac{1}{2}N_0$ and $N_0$. The output signals of the filters 7 and 8 are combined in an adder 9, the output signal of which is supplied to a modulator 10 in which it is modulated on a high-frequency carrier wave supplied by the source 10', which modulated carrier wave is supplied to a transmitting aerial.

Fig. 3 shows diagrammatically one embodiment of a receiver according to the invention. The signal transmitted by a transmitter as shown in Fig. 2 is received by a receiving aerial 11 and supplied to a device 12 comprising the high-frequency and intermediate-frequency stages. The output signal of device 12 is supplied to a video-detector 13, producing the signal $$[f_1g_2]0,\tfrac{1}{2}\omega_0+[f_2g_2]\tfrac{1}{2}\omega_0,\omega_0$$

This signal is supplied, on the one hand, to a low-pass filter 21 having a cut-off frequency $\frac{1}{2}N_0$ and, on the other, to a band-pass filter 22 having a transmission range comprised between the frequencies $\frac{1}{2}N_0$ and $N_0$. The output signal of the low-pass filter 21 is supplied to a sampler 19 and the output signal of bandpass filter 22 is supplied to a sampler 20. The series of pulses present in the output signal of video-detector 13 in this case serves itself as the reference signal required for producing the dotting signals. For this purpose the output signal of detector 13 is also supplied to a bandpass filter 14 having a very narrow transmission range located in the vicinity of the frequency $N_0$; the output signal of said filter is limited on two sides in a device 15. The signal thus limited is supplied to a lowpass filter 16 having a cut-off frequency comprised between $N_0$ and $2N_0$. This results in a substantially sinusoidal voltage at the output of said filter having a frequency equal to $N_0$. With the aid of the output signal of the filter 16, signals $G_1$ and $G_2$ are produced in devices 17 and 18, respectively, the signals $G_1$ and $G_2$ being supplied to samplers 19 and 20. The output signals of the samplers 19 and 20 are supplied to lowpass filters 23 and 24, respectively, both of which have a cut-off frequency $N_0$. Their output signals may further be supplied to picture tubes (not shown).

As mentioned before, a certain phase relation between the signals $g_1$ and $g_2$ and a corresponding phase relation between the signals $G_1$ and $G_2$ is not required. However, this is true only if the filters 7 and 21 have a sharp cut-off action at the frequency $\frac{1}{2}N_0$ and, similarly, the filters 8 and 22 have a sharp cut-off action at the frequency $\frac{1}{2}N_0$. However, filters having very sharp cut-off actions can be manufactured with difficulty only and the frequency ranges of the signals $[f_1g_1]0,\frac{1}{2}\omega_0$ and $[f_2g_2]\frac{1}{2}\omega_0,\ \omega_0$ both at the transmitting end and at the receiving end usually overlap a little in the vicinity of the frequency $\frac{1}{2}N_0$. In view thereof it is still, preferable to bring about a phase difference of $\pi$-radians between $g_1$ and $g_2$ and a similar phase difference between the signals $G_1$ and $G_2$. Furthermore, in this case it is preferable for the total transmission characteristic of the signal $[f_1g_1]0,\frac{1}{2}\omega_0$ to be so chosen that the signal for the frequency $\frac{1}{2}N_0$ is attenuated twice as much as the lower frequencies of this signal and also preferable for the transmission characteristic of the signal $[f_2g_2]\frac{1}{2}\omega_0,\ \omega_0$ to be so chosen that the signal for the frequency $\frac{1}{2}N_0$ is attenuated twice as much as the higher frequencies of this signal. Fig. 1 shows the transmission characteristics for the said two signals in which the transmissivity $\Gamma$ is plotted as a function of the angular freqency $\omega$. The curve A, B, C, D shows the tranmission characteristic for the signal $[f_1g_1]0,\frac{1}{2}\omega_0$ and the curve E, C, F, G, H, I shows the transmission characteristic for the signal $[f_2g_2]\frac{1}{2}\omega_0,\ \omega_0$. The figure shows that in both transmission characteristics the transmissivity is reduced by half at the frequency $\frac{1}{2}N_0$. It also appears from simple calculation that, in order to avoid crosstalk between the signals $f_1$ and $f_2$ in the frequency range comprised between the frequencies E and D, at least in the case of complete synchronisation between the signals $g_1$, $G_1$ and $g_2$, $G_2$, it is preferable to provide fon the slope of the transmission characteristic for the signal $[f_1g_1]0,\frac{1}{2}\omega_0$ between the frequencies E and D to be equal to that of the transmission characteristic for the signal $[f_2g_2]\frac{1}{2}\omega_0,\ \omega_0$ between the frequencies E and D.

What is claimed is:

1. A multiplex transmission system for television signals, comprising transmitter means for producing two video signals, means for producing a first dotting signal having a constant repetition frequency, sampler means for dotting said video signals with said dotting signal, means for limiting the bandwidth of one of said dotted signals to a first frequency range lying substantially between zero and one-half of said repetition frequency, means for limiting the bandwidth of the other of said dotted signals to a second frequency range lying substantially between one-half of said repetition frequency and said repetition frequency, means for combining the dotted signals thus limited in bandwidth, and receiver means for receiving the combined signals and comprising means for separating said combined signals into a first signal portion having a bandwidth lying substantially between the frequencies of zero and one-half of said repetition frequency and a second signal portion having a bandwidth lying substantially between the frequencies of one-half of said repetition frequency and said repetition frequency, means for producing a second dotting signal corresponding to said first dotting signal, sampler means for dotting said first signal portion with said second dotting signal in phase with the transmitted dotted signal lying in said first frequency range, and sampler means for dotting said second signal portion with said second dotting signal in phase with the transmitted dotted signal lying in said second frequency range.

2. A system as claimed in claim 1, in which said means for limiting the bandwidth of one of said dotted signals to a first frequency range comprises a filter having a transmission characteristic curve which has a generally flat amplitude level which decreases in the vicinity of one-half of said repetition frequency and has an amplitude equal to one-half of said amplitude level at said frequency of one-half of said repetition frequency, and in which said means for limiting the bandwidth of the other of said dotted signals to a second frequency range comprises a filter having a transmission characteristic curve which has a generally flat amplitude level which decreases in the vicinity of said frequency of one-half of said repetition frequency and has an amplitude equal to one-half of said last-named amplitude level at said frequency of one-half of said repetition frequency.

3. A system as claimed in claim 2, in which said filters are constructed to provide equal rates of slope of their respective characteristic curves in the vicinity of said frequency of one-half the repetition frequency, whereby said decreasing amplitudes of the transmission characteristic curves are complementary about said frequency of one-half of said repetiton frequency.

4. A system as claimed in claim 1, in which said transmitter sampler means for dotting the video signals includes phasing means connected so that said video signals are dotted $\pi$ radians out-of-phase.

5. A transmitter for use in a multiplex transmission system for television video signals, comprising means for producing a first dotting signal having a constant repetition frequency, sampler means for dotting said video signals with said dotting signal, means for limiting the bandwidth of one of said dotted signals to a first frequency range lying substantially between zero and one-half of said repetition frequency, means for limiting the bandwidth of the other of said dotted signals to a second frequency range lying substantially between one-half of said repetition frequency and said repetition frequency, and means for combining the dotted signals thus limited in bandwidth.

6. A transmitter as claimed in claim 5, in which said sampler means for dotting the video signals includes phasing means connected so that said video signals are dotted $\pi$ radians out-of-phase.

7. A receiver for receiving a combined television signal composed of a first dotted video signal having a frequency bandwidth lying substantially between zero and one-half of the dotting repetition frequency and a second dotted video signal having a frequency bandwidth lying substantially between one-half of said dotting repetition frequency and said dotting repetition frequency, said receiver comprising means for separating said combined signals into a first signal portion having a bandwidth lying substantially between the frequencies of zero and one-half of said repetition frequency and a second signal portion having a bandwidth lying substantially between the frequencies of one-half of said repetition frequency and said repetition frequency, means for producing a dotting signal corresponding to the dotting of said video signals, sampler means for dotting said first signal portion with said dotting signal in phase with the transmitted dotted signal lying in said first frequency range, and sampler means for dotting said second signal portion with said dotting signal in phase with the transmitted dotted signal lying in said second frequency range.

8. A receiver as claimed in claim 7, in which said means for separating the combined signals comprises a pair of filters having frequency transmission characteristics which have generally flat amplitude levels and which decrease in amplitude in the vicinity of a frequency equal to one-half of said dotting repetition frequency and have amplitudes equal to one-half of said amplitude levels at said frequency of one-half of said repetition frequency.

9. A receiver as claimed in claim 8, in which filters are constructed to provide equal rates of slope of their respective characteristic curves in the vicinity of said frequency of one-half the repetition frequency, whereby said decreasing amplitudes of the transmission characteristics are complementary about said frequency of one-half of said repetition frequency.

10. A receiver as claimed in claim 8, in which said video signals are dotted $\pi$ radians out-of-phase, and in which said sampler means include phasing means connected so that said signal portions are dotted $\pi$ radians out-of-phase.

References Cited in the file of this patent

UNITED STATES PATENTS

| | | |
|---|---|---|
| 2,634,324 | Bedford | Apr. 7, 1953 |
| 2,635,140 | Dome | Apr. 14, 1953 |
| 2,677,721 | Bedford | May 4, 1954 |
| 2,725,425 | Sziklai | Nov. 29, 1955 |
| 2,787,660 | Teer | Apr. 2, 1957 |
| 2,828,354 | Haantzes et al. | Mar. 25, 1958 |
| 2,838,597 | De Vrijer | June 10, 1958 |
| 2,870,248 | Valeton et al. | Jan. 20, 1959 |